US008762363B1

(12) United States Patent
Koo et al.

(10) Patent No.: US 8,762,363 B1

(45) Date of Patent: Jun. 24, 2014

(54) ADDING SYNONYM RULES BASED ON HISTORIC DATA

(75) Inventors: Terry Yang-Hoe Koo, San Francisco, CA (US); Dan Popovici, Cupertino, CA (US); Xin Zheng, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 60 days.

(21) Appl. No.: 13/532,326

(22) Filed: Jun. 25, 2012

Related U.S. Application Data

(60) Provisional application No. 61/524,987, filed on Aug. 18, 2011.

(51) Int. Cl.
*G06F 7/00* (2006.01)
*G06F 17/30* (2006.01)

(52) U.S. Cl.
CPC ................................ *G06F 17/30737* (2013.01)
USPC .......................................................... 707/706

(58) Field of Classification Search
None
See application file for complete search history.

(56) References Cited

U.S. PATENT DOCUMENTS

| | | | | |
|---|---|---|---|---|
| 8,103,669 | B2 | 1/2012 | Castellani | |
| 8,316,007 | B2 | 11/2012 | Liao | |
| 8,321,201 | B1 * | 11/2012 | Baker et al. | 704/9 |
| 2002/0156816 | A1 | 10/2002 | Kantrowitz | |
| 2009/0006359 | A1 * | 1/2009 | Liao | 707/5 |
| 2012/0095951 | A1 * | 4/2012 | Ray | 706/47 |

OTHER PUBLICATIONS

Ananthanarayanan et al., "Rule based synonyms for entity extraction from noisy text", In Proceedings of the second workshop on Analytics for noisy unstructured text data, pp. 31-38, ACM, Jul. 2008.*

* cited by examiner

*Primary Examiner* — Jay Morrison

(74) *Attorney, Agent, or Firm* — Fish & Richardson P.C.

(57) ABSTRACT

Methods, systems, and apparatus, including computer programs encoded on a computer storage medium, for adding synonym rules based on historic data. According to one implementation, a method includes receiving an indication that a synonym rule that was previously added to a collection of synonym rules is no longer being added to the collection, and receiving historic usage data relating to the synonym rule. The method also includes determining, using the historic usage data relating to the synonym rule, whether to add the synonym rule to the collection, and, in response to determining to add the synonym rule, adding the synonym rule to the collection.

28 Claims, 6 Drawing Sheets

ADDING SYNONYM RULES BASED ON HISTORIC DATA

CROSS REFERENCE TO RELATED APPLICATIONS

This patent application claims the benefit of priority of U.S. Provisional Patent Application No. 61/524,987, filed Aug. 18, 2011. The content of U.S. Provisional Patent Application No. 61/524,987 is hereby incorporated by reference into this application as if set forth herein in full.

BACKGROUND

This specification generally relates to search engines, and one particular implementation relates to evaluating synonym rules using historic usage data.

SUMMARY

According to one innovative aspect of the subject matter described in this specification, usage data relating to users' interactions with search results obtained using revised search queries is aggregated over time, and is evaluated to determine the quality of the synonym rules that were used to revise the search queries. When a synonym model that is used to add or remove synonym rules from a collection of synonym rules is altered, the synonym model may determine that a particular synonym rule is to be removed from the collection. When this occurs, a different model or engine may analyze the usage data to determine whether the particular synonym rule has had a positive impact on search results and, and if so, the different model or engine may override the determination of the synonym model, and may determine that the particular synonym rule is to be added to the collection.

According to another innovative aspect of the subject matter described in this specification, a method includes receiving an indication that a synonym rule that was previously added to a collection of synonym rules is no longer being added to the collection, and receiving historic usage data relating to the synonym rule. The method also includes determining, using the historic usage data relating to the synonym rule, whether to add the synonym rule to the collection, and, in response to determining to add the synonym rule, adding the synonym rule to the collection.

Other embodiments of these aspects include corresponding systems, apparatus, and computer programs, configured to perform the actions of the methods, encoded on computer storage devices.

These and other embodiments may each optionally include one or more of the following features. For instance, the collection of synonym rules includes synonym rules that a query revision engine uses to revise search queries; receiving an indication includes receiving, from a synonym engine, an indication that a model that is used by the synonym engine to determine whether synonym rules are to be added to the collection has determined that the synonym rule is to not be added to the collection, and adding the synonym rule includes adding the synonym rule despite receiving the indication that the synonym rule is not to be added to the collection; receiving an indication includes receiving an indication that the synonym rule has been removed from, or is to be removed from, the collection; the historic usage data relating to the synonym rule includes data that reflects whether, when a search engine revised a search query using the synonym rule, a user was satisfied with a search result associated with the revised search query; the data that reflects whether a user was satisfied with a search result associated with the revised search query includes data that reflects whether a user selected or did not select a search result associated with the revised search query; determining whether to add the synonym rule to the collection includes determining that, when the synonym rule was previously added to the collection, an exception was defined for the synonym rule; and adding the synonym rule to the collection includes defining the same exception for the synonym rule when the synonym rule is added to the collection; the synonym rule is a specific context synonym rule; receiving historic usage data relating to the synonym rule includes receiving historic usage data relating to the specific context synonym rule, determining that a general context synonym rule that corresponds to the specific context synonym rule is currently added to the collection of synonym rules, then receiving historic usage data relating to the general context synonym rule correspond to the specific context synonym rule; the synonym rule is a specific context synonym rule, and receiving historic usage data relating to the synonym rule includes determining that a general context synonym rule that corresponds to the specific context synonym rule is not currently added to the collection of synonym rules, then receiving historic usage data relating to the specific context synonym rule without receiving historic usage data relating to the general context synonym rule.

Advantageous implementations may include one or more of the following features. The developers of a search system may have the flexibility to experiment with various criteria in a synonym model to evaluate and generate new synonym rules, while avoiding the risk of removal of existing synonym rules which have been demonstrated to yield positive user feedbacks over time from the collection. Synonym rules without accumulated historic usage data (e.g., an exception context to a synonym rule) will not be improperly added to a collection. Historic usage data can be stored and evaluated under specific contexts corresponding to context-specific synonym rules.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
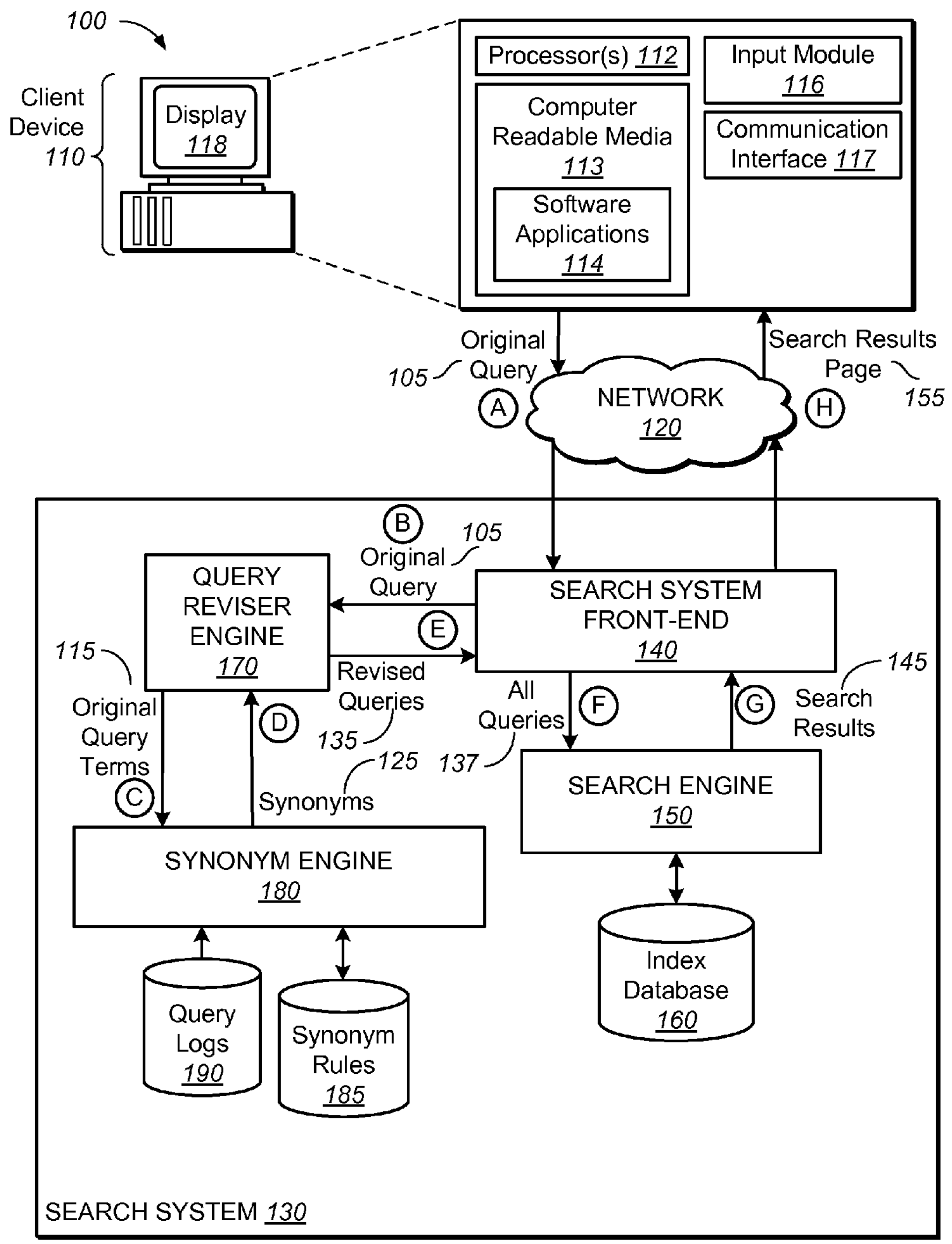
FIG. 1 is a block diagram of an example system that can use synonyms to generate search results.

FIG. 1 is a diagram of an example system 100 that can use synonyms to generate search results. In general, the system 100 includes a client device 110 coupled to a search system 130 over a network 120. The search system 130 includes a search engine 150, a query reviser engine 170, and a synonym engine 180. The search system 130 receives a query 105, referred to by this specification as the "original query" or an "initial query," from the client device 110 over the network 120. The search system 130 provides a search results page 155, which presents search results 145 identified as being responsive to the query 105, to the client device 110 over the network 120.

In some implementations, the search results 145 identified by the search system 130 can include one or more search results that are identified as being responsive to queries that are different than the original query 105. The search system 130 can generate or obtain other queries in numerous ways (e.g., by revising the original query 105).

In some implementations, the search system 130 can generate a revised query by adding to the original query 105 additional terms that are synonyms of one or more terms that occur in the original query 105. In other implementations, the search system 130 can generate a revised query by substituting terms that are synonyms of terms that occur in the original query 105, in place of the terms in the original query 105. The synonym engine 180 can determine the additional terms that are candidate synonyms for the one or more terms that occur in the original query. The query reviser engine 170 can generate the revised query. The search engine 150 can use the original query 105 and the revised queries to identify and rank search results. The search engine 150 can provide the identified search results 145 to the client device 110 on the search results page 155.

The synonym engine 180 can identify the synonyms the query reviser engine 170 can use to generate revised queries by evaluating terms included in previously received queries stored in a query logs database 190. The queries stored in the query logs database 190 can include previous queries where a user considered the results of the queries desirable. For example, the user can select the provided search results from a query, in effect, validating the search results. The queries stored in the query logs database 190 can include previous queries determined by the search system 130 as providing desirable results. For example, the search system 130 can perform a quality thresholding for returned search results from a query. The quality thresholding can include determining search results that have historically been returned for a particular query. Search results above the quality threshold can validate a query, which the search system 130 can then include in the query logs database 190.

For example, given a first term ("cat"), the synonym engine 180 can evaluate terms ("feline" or "banana") that are candidate synonyms for the original term. In addition, the synonym engine 180 can determine that certain terms are synonyms of the first term (as in the case of "feline"), and that other terms are not synonyms of the first term (as in the case of "banana"). The synonym engine 180 can base this determination on rules stored in a synonym rules database 185. For example, a synonym rule can define that "feline" is a synonym for cat and "banana" is not a synonym for cat.

The search system 130 can define synonym rules to apply generally, or to apply only when particular conditions, or "query contexts," are satisfied. For example, the query context of a synonym rule can specify one or more other terms that should be present in the query for the synonym rule to apply. Furthermore, query contexts can specify relative locations for the other terms (e.g., to the right or left of a query term under evaluation). In another example, query contexts can specify a general location (e.g., anywhere in the query). For example, a particular synonym rule can specify that the term "pet" is a synonym for the query term "dog," but only when the query term "dog" is followed by the term "food" in the query. Multiple distinct synonym rules can generate the same synonym for a given query term. For example, for the query term "dog" in the query "dog food," the term "pet" can be specified as a synonym for "dog" by both a synonym rule for "dog" in the general context and a synonym rule for "dog" when followed by "food."

The synonym rules can depend on query contexts that define other terms in the original query 105. In other words, a synonym rule need not apply in all situations. For example, when the term "cats" is used as a single-term query, the term "felines" can be considered a synonym for "cats". The synonym engine 180 can return the term "felines" to the query reviser engine 170 to generate a revised search query. In another example, when the query includes the term "cats" followed by the term "musical," a synonym rule can specify that the term "felines" is not a synonym for "cats." In some implementations, the synonym rules can be stored in the synonym rules database 185 for use by the synonym engine 180, the query reviser engine 170, or the search engine 150.

In the illustrative example of FIG. 1, the search system 130 can be implemented as computer programs running on one or more computers in one or more locations that are coupled to each other through a network (e.g., network 120). The search system 130 includes a search system front end 140 (e.g., a "gateway server") that coordinates requests between other parts of the search system 130 and the client device 110. The search system 130 also includes one or more "engines": the search engine 150, a query reviser engine 170, and the synonym engine 180.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, the search engine 150, the query reviser engine 170, and the synonym engine 180 can be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine), an input module 116 (e.g., a keyboard or mouse), a communication interface 117, and a display device 118. The computing device or devices that implement the search system front-end 140, the query reviser engine 170, and the search engine 150 may include similar or different components.

In general, the search system front-end 140 receives the original query 105 from the client device 110. The search system front-end 140 routes the original query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine (e.g., the search system front-end 140, the query reviser engine 170, and the search engine 150, respectively) may be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state (A), a user of the client device 110 enters original query terms 115 for the original query 105, and the client device 110 communicates the original query 105 to the search system 130 over the network 120. For example, the user can submit the original query 105 by initiating a search dialogue on the client device 110, speaking or typing the original query terms 115 of the original query 105, and then pressing a search initiation button or control on the client device 110. The client device 110 formulates the original query 105 (e.g., by specifying search parameters). The client device 110 transmits the original query 105 over the network 120 to the search system 130.

Although this specification refers to the query 105 as an "original" or an "initial" query, such reference is merely intended to distinguish this query from other queries, such as the revised queries that are described below. The designation of the original query 105 as "original" is not intended to require the original query 105 to be the first query that is entered by the user, or to be a query that is manually entered. For example, the original query 105 can be the second or subsequent query entered by the user. In another example, the original query 105 can be automatically derived (e.g., by the query reviser engine 170). In another example, the original query 105 can be modified based on prior queries entered by the user, location information, and the like.

During state (B), the search system front-end 140 receives the original query 105 and communicates the original query 105 to the query reviser engine 170. The query reviser engine 170 can generate one or more revised queries 135 based on the substance of the original query 105. In some implementations, the query reviser engine 170 generates a revised query by adding terms to the original query 105 using synonyms 125 for terms in the original query 105. In other implementations, the query reviser engine 170 generates a revised query by substituting the synonyms 125 for the corresponding terms of the original query 105. The query reviser engine 170 can obtain synonyms 125 for use in revising the original query 105 from the synonym engine 180.

During state (C), the query reviser engine 170 communicates original query terms 115 of the original query 105 to the synonym engine 180. The synonym engine 180 can use synonym rules included in the synonym rules database 185 to determine one or more synonyms 125 for one or more of the original query terms 115 of the original query 105.

The synonym engine 180 communicates synonyms 125 to the query reviser engine 170 during state (D). The query reviser engine 170 generates one or more revised queries 135 by adding synonyms 125 to the original query 105. In addition, the query reviser engine 170 can generate one or more revised queries 135 by substituting certain terms of the original query 105.

The query reviser engine 170 communicates the one or more revised queries 135 to the search system front-end 140 during state (E). The search system front-end 140 communicates the original query 105 along with the one or more revised queries 135 to the search engine 150 as all queries 137 during state (F). The search engine 150 generates search results 145 that it identifies as being responsive to the original query 105 and/or the one or more revised queries 135. The search engine 150 can identify search results 145 for each query using an index database 160 that stores indexed resources (e.g., web pages, images, or news articles on the Internet). The search engine 150 can combine and rank the identified search results 145 and communicate the search results 145 to the search system front-end 140 during state (G).

The search system front-end 140 generates a search results page 155 that identifies the search results 145. For example, each of the search results 145 can include, but are not limited to, titles, text snippets, images, links, reviews, or other information. The original query terms 115 or the synonyms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original query terms 115 of the original query 105 in a query box (or "search box"), located, for example, on the top of the search results page 155. In addition, the client device 110 can display the search results 145 in a search results box, for example, located on the left-hand side of the search results page 155.

The search system front-end 140 generates a search results page 155 that identifies the search results 145. For example, each of the search results 145 can include, but are not limited to, titles, text snippets, images, links, reviews, or other information. The original query terms 115 or the synonyms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original query terms 115 of the original query 105 in a query box (or "search box"), located, for example, on the top of the search results page 155. In addition, the client device 110 can display the search results 145 in a search results box, for example, located on the left-hand side of the search results page 155.

Figure 2:
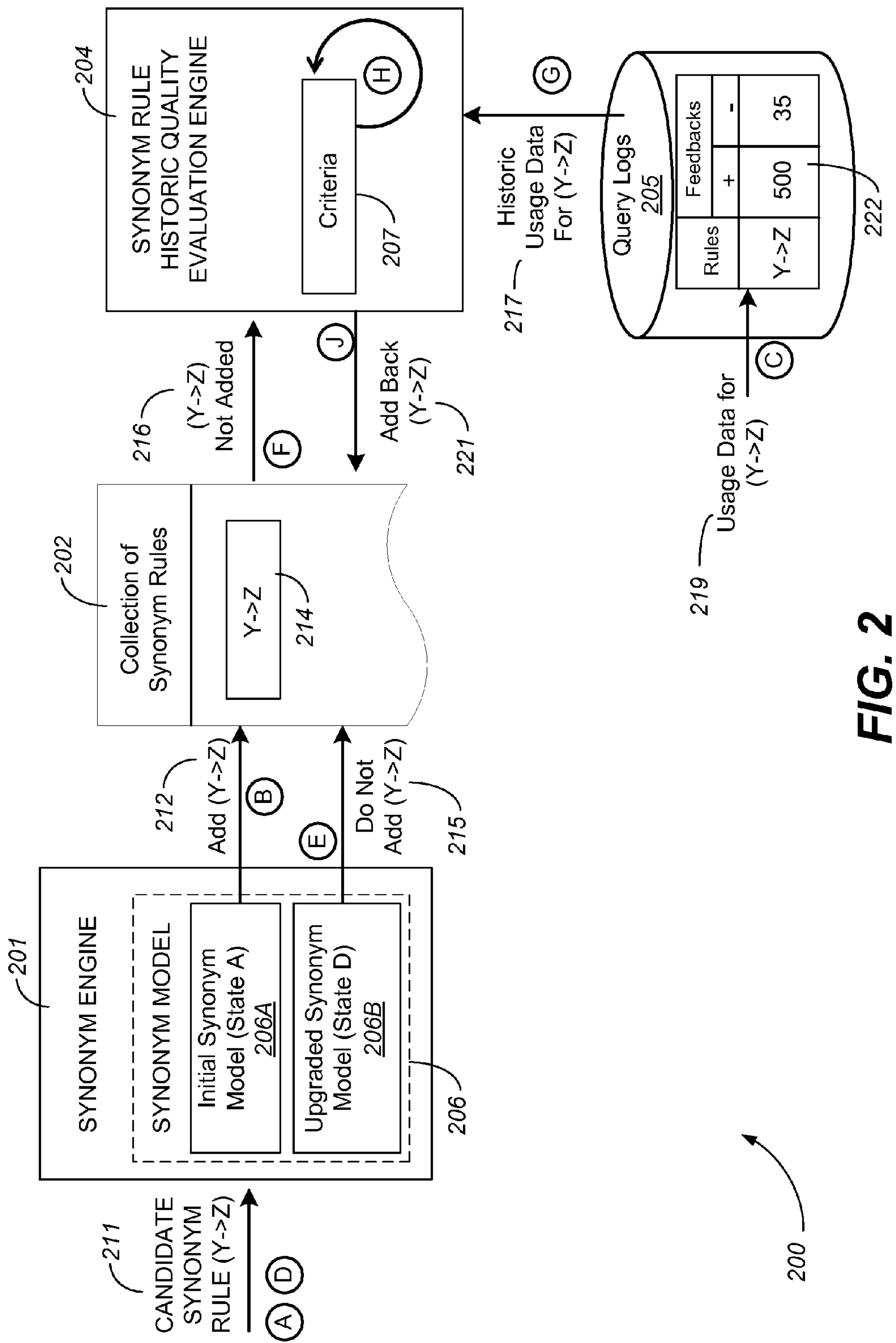
FIG. 2 is a block diagram of an example system that evaluates synonym rules.

FIG. 2 is a diagram of an example system 200 that evaluates synonym rules. Briefly, if the system 200 determines that a candidate synonym rule that was previously added to a collection of synonym rules is no longer being added to the collection, the system 200 (i) gathers historic usage data related to user queries involving the candidate synonym rule, (ii) evaluates the candidate synonym rule using the historic usage data, and (iii) determines whether to add the candidate synonym rule back to the collection. In general, the system 200 includes a synonym engine 201, a collection 202 of synonym rules, a synonym rule historic quality evaluation engine 204, and a query log 205.

In general, the synonym engine 201 uses a synonym model 206 to determine whether to add a candidate synonym rule 211 to the collection 202 of synonym rules. The collection 202 of synonym rules is, for example, a list or other data structure that specifies which synonyms or synonym rules that a query reviser may use to revise search queries. In an alternative implementation, the collection 202 of synonym rules may be a list of synonyms or synonym rules that a query reviser may not use to revise search queries.

In more detail, the synonym model 206 receives a candidate synonym rule 211 as input. Through manual or automated processes, the model 206 evaluates the candidate rule 211 and determines whether to add the candidate synonym rule 211 to a collection 202 of synonym rules. In some implementations, the model 206 can instead indicate that the rule 211 is to be removed from the collection 202. The synonym model 206 may evaluate candidate synonym rules using different criteria, where each criterion can have a different weight or importance.

Because the different criteria of the model 206 may be adjusted over time in order to improve the overall quality of generated search results, the output of the model 206 can also vary over time for the same, given input. For example, during an initial state, the synonym engine 201 may include an initial version of the synonym model 206A that uses an initial set of criteria or parameters, and during a later state, the synonym engine 201 may include upgraded version of the synonym model 206B that uses a different set of criteria or parameters.

Since the output of the model 206 may vary over time depending on the changing criteria of the model 206, the content of the collection 202 of synonym rules may also vary over time. For example, the model 206 can determine to add a candidate synonym rule at one point in time, and can determine to remove or not add the same candidate synonym rule at a later point in time.

The model 206 may evaluate synonym rules for inclusion in the collection 202 occasionally, periodically, or continuously, and can occasionally, periodically, or continuously output indicia that reflect the result of the evaluation. Synonym rules may be evaluated by the model 206 individually, or batches of synonym rules may be evaluated. The model 206 may, for example, evaluate synonym rules that are included in the collection 202 with a particular evaluation frequency, and may evaluate synonym rules that are not included in the collection with a different evaluation frequency.

Because adjustments are performed on the model 206 based on their positive impact to the quality of search results in the aggregate, however, particular adjustments may negatively impact particular search results. For instance, an adjustment to the model 206 may improve the overall quality of search results, but may disallow the use of some synonym rules in certain useful circumstances, and may allow the use of other synonym rules in unhelpful circumstances. For instance, an adjustment to the model 206 may result in the removal of a synonym rule from the collection 202, even though historical data associated with the synonym rule establishes that the synonym rule has a positive impact on the quality of particular search results.

In some implementations, the output of synonym engine 201 may identify synonym rules which are to be included in set of synonym rules in the collection 202, for example by replacing an existing set of synonym rules in the collection 202 or by adding synonym rules to the existing set. In another implementation, the output of the synonym engine 201 may be an indication to add or remove one or more synonym rules to or from the collection 202. The indication can be included in a message format (e.g., text, binary, etc.) that can be interpreted and acted upon by the collection 202 or by a manager of the collection 202.

In general, the synonym rule historic quality evaluation engine 204 evaluates whether a candidate synonym rule is to be included in the collection of synonym rules 202 based on historic usage data. The query log 205 contains historic usage data from user queries, including usage data 219 associated with queries in which synonym rules have been applied to revise original query terms.

In more detail, the synonym rule historic quality evaluation engine 204 evaluates the quality of a synonym rule using criteria that are fundamentally different than the criteria applied by the synonym model 206. The synonym rule historic quality evaluation engine 204 uses historic usage data from the query log 205 exclusively as criteria 207 to evaluate a candidate synonym rule 211, whereas the synonym model 206 may or may not use historic usage data from the query log 205 as criteria to evaluate a candidate synonym rule 211. The output of the synonym rule historic quality evaluation engine 204, which can be an indication to the collection 202, can be implemented to override an indication from the synonym engine 201 to the collection 202 to add or not add a candidate synonym rule to the collection 202.

The user query log 205 is a repository which stores usage data 219. The usage data 219 is collected over time based on users' interactions with search results that may or may not have been generated using search queries that were revised using synonyms. The usage data 219 can contain information regarding the synonym rules applied to the original query terms, and the users' interactions to search results based on revised search queries. The usage data can also reflect the quality of the search, indicating, for example, whether a user was or was not satisfied with a particular search result, by analyzing whether the user selects a result that was generated using a revised search query. A quantitative score 222 can be assigned to the usage data 219 in the query log 205, and the score 222 can be analyzed by criteria 207 in the synonym rule historic quality evaluation engine's 204 evaluation of a candidate synonym rule 211.

A synonym rule in the collection 202 is a rule which has been selected for use by a query reviser engine in revising search queries. The selection can be determined by an evaluation or test under certain criteria. The evaluation can be performed by the synonym engine 201, the synonym rule historic quality evaluation engine 204, or another engine not specified in the system 200. In the present example, synonym rules are stored in the collection 202 as a data structure 214. The data structure 214 may be constructed in any type of format (e.g., text, binary, etc.), as long as the collection 202 can modify the data structure 214 within the collection 202, and can communicate the modification with the rest of the system 200 through indications.

FIG. 2 also illustrates an example flow of data, shown in states (A) to (J). States (A) to (J) may occur in the illustrated sequence, or they may occur in a sequence that is different than in the illustrated sequence. During state (A), a candidate synonym rule 211 is received for evaluation by the synonym engine 201. A candidate synonym rule specifies a term which can be substituted for another term. The candidate synonym rule can be constructed through user requests, or through some other components of a system harvesting the query logs 205. In some implementations, user search history during a search session can also be used to construct the candidate synonym rule. In FIG. 2, the candidate synonym rule "(Y→Z)" indicates that a query reviser may revise search queries that include the query term "Y" to include the query term "Z".

During state (B), an initial synonym model 206A evaluates the candidate synonym rule 211, and determines that the candidate synonym rule 211 is to be added to the collection 202. The synonym engine 201 then sends an indication 212 to add the candidate synonym rule 211 to the collection 202. The candidate synonym rule 211 is added within a data structure 214 in the collection 202.

During state (C), after the candidate synonym rule 211 has been added to the collection 202, search queries that include the query term "Y" will be revised by a query reviser to include the query term "Z". The search engine will use the revised search queries to generate search results, and users will interact with the search results.

In some implementations, if the user selects a search result that was generated using the revised search query, positive feedback may be recorded in the query log 205 for the candidate synonym rule 211. Alternatively, if the user does not select a search result that was generated using the revised search query, negative feedback may be recorded in the query log 205 for the candidate synonym rule 211. In an alternative implementation, the click-thru-rate (CTR), which can be defined as the number of times a user selects a search result based on the revised search query over the total number of times a user is presented a search result based on the revised search query, can be applied to provide the metric for positive and negative feedbacks. The usage data 219 for the candidate synonym rule 211 may indicate the magnitude or extent of any positive or negative feedback that is associated with the candidate synonym rule 211. The query log 205 then stores this usage data 219, and can provide this usage data 219 to engines that can perform analysis on the usage data 219 as data accumulates over time.

During state (D), at a time after the candidate synonym rule 211 has already been added to the collection 202, and after the initial synonym model 206A has been upgraded to the upgraded synonym model 206B, the same candidate synonym rule 211 is submitted to the synonym engine 201 for evaluation. During state (E), the upgraded synonym model 206B evaluates the candidate synonym rule 211, and determines to not add the candidate synonym rule 211 to the collection 202. The synonym engine 201 then send an indication 215 to not add the candidate synonym rule 211 the collection 202.

During state (F), an indication 216 is sent to the synonym rule historic quality evaluation engine 204 notifying the synonym rule historic quality evaluation engine 204 that the synonym engine 201 has determined to not add the candidate synonym rule 211 to the collection 202. The indication 216 can be a notification from the collection 202, or the indication 216 may result from the synonym rule historic quality evaluation engine 202 periodically checking the contents of the collection 202. In some implementations, the indication may come from the synonym engine 201 or another component having knowledge of the indication.

During state (G), the synonym rule historic quality evaluation engine 204 requests and receives historic usage data 217 for the candidate synonym rule 211. The historic usage data 217 includes the usage data 219 accumulated in the query logs 205 for the candidate synonym rule 211 over time. In some implementations, the synonym rule historic quality evaluation engine 204 may also request and receive historic usage data for synonym rules that are related to the candidate synonym rule 211, such as synonym rules that make similar term substitutions under specific contexts, or in the general context.

During state (H), the synonym rule historic quality evaluation engine 204 applies criteria 207 to historic usage data 217 to evaluate the candidate synonym rule 211. The evaluation is independent of the evaluation performed by the upgraded synonym model 206B. In the synonym rule historic quality evaluation engine's 204 analysis, at least historic usage data 217 is evaluated. Here, a positive measurable impact is evaluated by criteria 207 for the candidate synonym rule 211, and the historic quality evaluation engine 204 determines to add the candidate synonym rule 211 back to the collection 202.

During state (J), an indication 221 is sent to add the candidate synonym rule to the collection 202, and the candidate synonym rule 211 is added to the collection 202, despite the synonym engine's indication 215 during state (E) that the candidate rule 211 is not be added to the collection 202.

Figure 3:
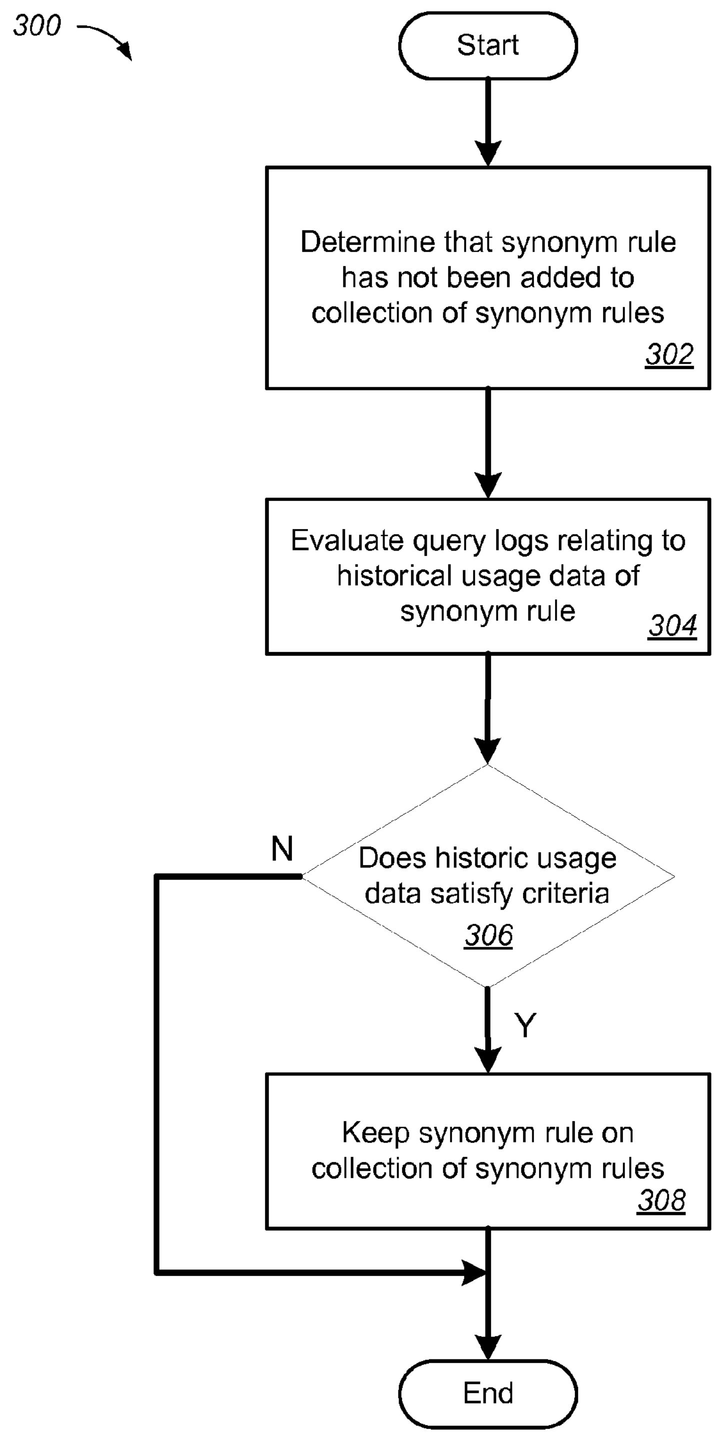
FIG. 3 is a flow chart illustrating an example process for adding back synonym rules based on evaluation of historic usage data.

FIG. 3 is a flow chart illustrating an example process 300 for adding back synonym rules based on evaluation of historic usage data. In general, the process 300 analyzes historic usage data corresponding to a synonym rule to determine whether to add the synonym rule to a collection of synonym rules. The process 300 will be described as being performed by a computer system comprising one or more computers, for example, the synonym rule historic quality evaluation engine 204 as shown in FIG. 2.

The system receives an indication and determines that a synonym rule that was previously added to a collection of synonym rules is no longer being added to the collection of synonym rules (302). In general, a collection includes synonym rules that a query revision engine uses to revise search queries. A synonym model inside a synonym engine applies various criteria, of which the criteria may be adjusted over time, to determine whether to add a synonym rule to the collection.

A decision is made by the synonym model and is sent from the synonym engine to the collection or a manager of the collection to add, not add, or remove the synonym rule from the collection. An indication of the decision is then sent to the system, where the indication can be a notification from the collection, or the indication may result from the system periodically checking the contents of the collection. In some implementations, the indication may come from the synonym engine or another component having knowledge of the indication. The indication can be included in a message format (e.g., text, binary, etc.) that can be interpreted and acted upon by the system.

The system receives historic usage data relating to the synonym rule from a query log, and evaluates the historic usage data relating to the synonym rule (304). A query log is a repository which stores historic usage data. The historic usage data relating to the synonym rule includes data collected over time which reflects whether, when a search engine revised a search query using the synonym rule, a user was satisfied with a search result associated with the revised search query. In some implementations, the historic usage data that reflects a user's satisfaction with the revised search query includes data that reflects whether a user selected or did not select a search result associated with the revised search query. A quantitative score can then be assigned to the historic usage data in the query log.

The synonym rule can either be general context, in which the synonym rule applies regardless of other terms in the query, or the synonym rule can be context-specific, in which the synonym rule only applies when other particular words are in the query. For example, the rule "cat→pet" can be modified to apply only when the query term "cat" is followed by the query term "food." The historic usage data for both general context and context-specific synonym rules would be stored in the user query log. In some implementations, during historic usage data analysis for a context-specific synonym rule, the system may review historic usage data for both general context and context-specific synonym rules if the general context synonym rule is currently added to the collection of synonym rules. During historic usage data analysis for a context-specific synonym rule, the system may not evaluate the historic usage data for a general context synonym rule if the general context synonym rule is not currently added to the collection of synonym rules.

In some implementations, a context-specific exception can be defined for a general context synonym rule. For example, the rule "cat→pet" can be modified to apply in all queries except when the query term "cat" is followed by the query term "breed." The historic usage data for the general context synonym rule is stored in the query log. However, the historic usage data for the context-specific exception is not stored in the query log because the original query term is not substituted by the synonym query term in the exception context. During historic usage data analysis for an exception-defined general context synonym rule, the system would evaluate the historic usage data for the general context synonym rule even when the historic usage data for the exception context is not available.

The system applies a set of criteria to historic usage data and determines whether the synonym rule satisfies the criteria (306). In general, the criteria are at least based on the quality of the historic usage data. Since the system may evaluate the synonym rule both in general and specific contexts, in some implementations, the criteria associated with different contexts for the synonym rule may have different weights. In another implementation, the criteria may have different weights associated to historic usage data segments at different time segments.

If the system determines the historic usage data associated with the synonym rule does not satisfy the criteria, the system does not add the synonym rule back to the collection. In another implementation, the system sends an indication to the collection to remove the synonym rule from the collection.

If the system determines the historic usage data associated with the synonym rule satisfies the criteria, the system sends an indication to the collection to keep the synonym rule in the collection (308). In another implementation, the system may send an indication to the collection to add the synonym rule to the collection.

When an exception is associated with the synonym rule and if the system determines the historic usage data for the general context synonym rule satisfies the criteria, the system sends an indication to keep the synonym rule with the exception defined in the collection. In another implementation, the system may send an indication to the collection to add the synonym rule with the exception defined to the collection.

Figure 4:
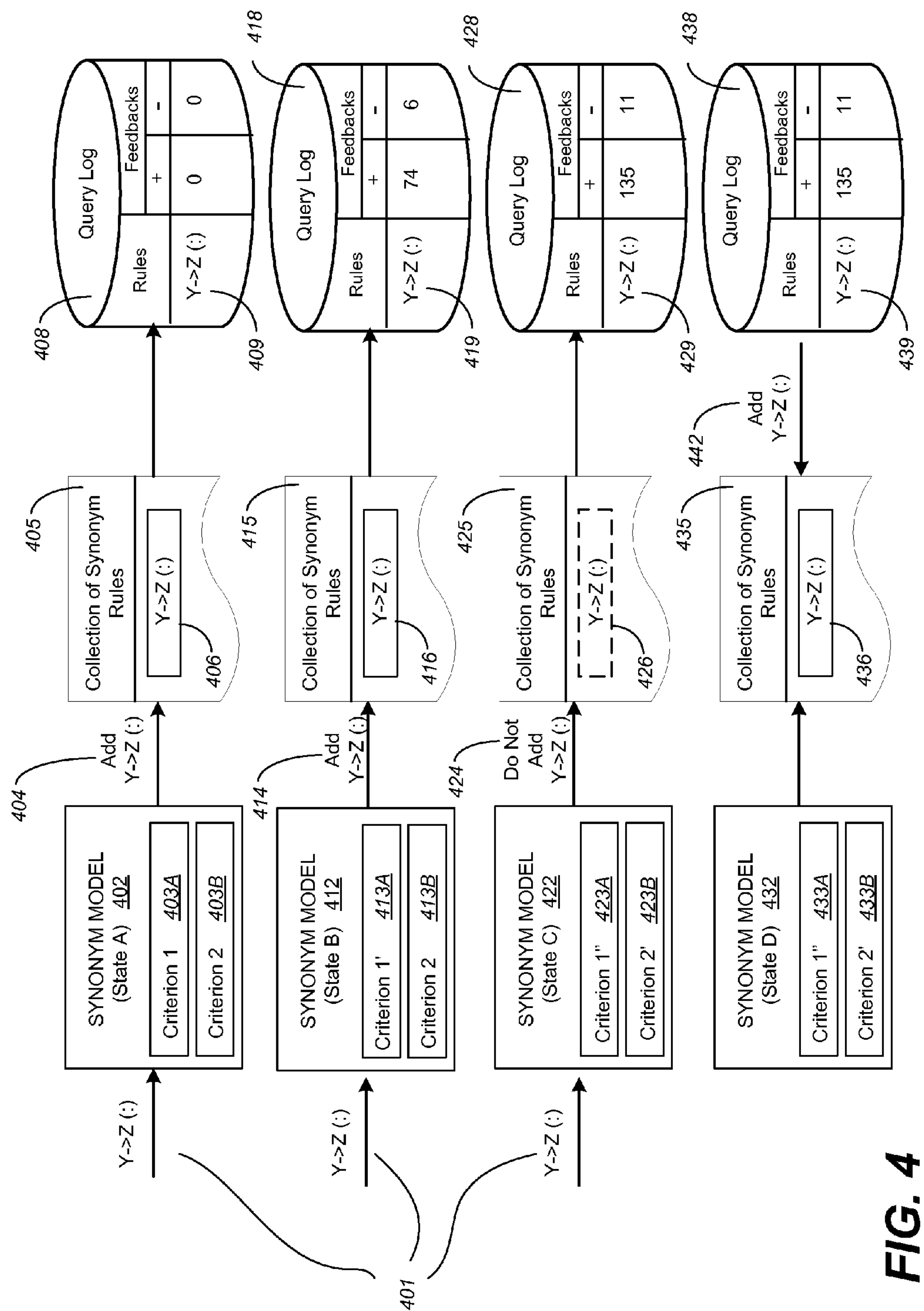
FIG. 4 shows an example of adding back a general context synonym rule based on evaluation of historic usage data.

FIG. 4 shows an example of adding back a general context synonym rule based on the evaluation of historic usage data, where each succeeding state occurs at some time later than the previous state. During state (A), the synonym model 402 evaluates the general context synonym rule (in the figure, "Y→Z (:)") 401 using criteria {Criterion 1} 403A and {Criterion 2} 403B. The general context synonym rule 401 satisfies the two criteria 403A and 403B, and the synonym model 402 sends an indication 404 to add the general context synonym rule 401 to the collection 405 of synonym rules.

The general context synonym rule 401 is added to a data structure 406 in the collection 405. Prior to receiving the indication 404, the general context synonym rule 401 has not been added to the collection 405, so there is no user interaction associated with this general context synonym rule. The historic usage data 409 for the general context synonym rule 401 in the query log 408 is therefore zero or empty.

During state (B), the synonym model 412 evaluates the general context synonym rule 401 using upgraded criteria {Criterion 1'}413A and {Criterion 2} 413B. The general context synonym rule 401 satisfies the two criteria 413A and 413B, and the synonym model 412 sends an indication 414 to add the general context synonym rule 401 to the collection 415 of synonym rules.

The general context synonym rule 401 is added to a data structure 416 in the collection 415. During state (B), since the collection 415 has already included the general context synonym rule 401 over a period of time, user interactions associated with this general context synonym rule have accumulated in the query log 418.

In some implementations, the historic usage data 419 contains positive and negative feedback. For example, a positive feedback is recorded when a user selects the search result that was identified based on the revised query terms constructed from the general context synonym rule, whereas a negative feedback is recorded when a user does not select the search result that was identified based on the revised query terms constructed from the general context synonym rule. Here, the historic usage data 419 for the general context synonym rule 401 includes a positive feedback of "74" and a negative feedback of "6," suggesting that the rule has an overall positive impact on search results and should remain in the collection.

During state (C), the synonym model 422 evaluates the general context synonym rule 401 using upgraded criteria {Criterion 1"}423A and {Criterion 2'} 423B. Here, the general context synonym rule 401 does not satisfy one or both of the criteria 423A and 423B, and the synonym model 422 sends an indication 424 to not add the general context synonym rule 401 to the collection 425 of synonym rules. The general context synonym rule 401 is then removed from the data structure containing the synonym rules in the collection 425, as illustrated as the dashed box 426. During state (C), since the collection 425 has already contained the general context synonym rule 401 over a period of time prior to the synonym rule removal, user interactions associated with this general context synonym rule have further accumulated in the query log 428. Here, the historic usage data 429 for the general context synonym rule 401 includes a positive feedback of "135" and a negative feedback of "11."

During state (D), an indication that a synonym rule which was in the collection has now been removed is received, and the historic usage data 439 in the query log 438 is evaluated. In this present example, the evaluation criterion is satisfied when the counts of positive feedbacks exceed the counts of negative feedbacks for the general context synonym rule 401. Here, the criterion is satisfied, and an indication 442 is sent to the collection 435 to add the general context synonym rule 401 back to the data structure 436 in the collection 435. Other evaluation criteria, such as criteria that weight positive feedback more or less than negative feedback, may also be used.

Figure 5:
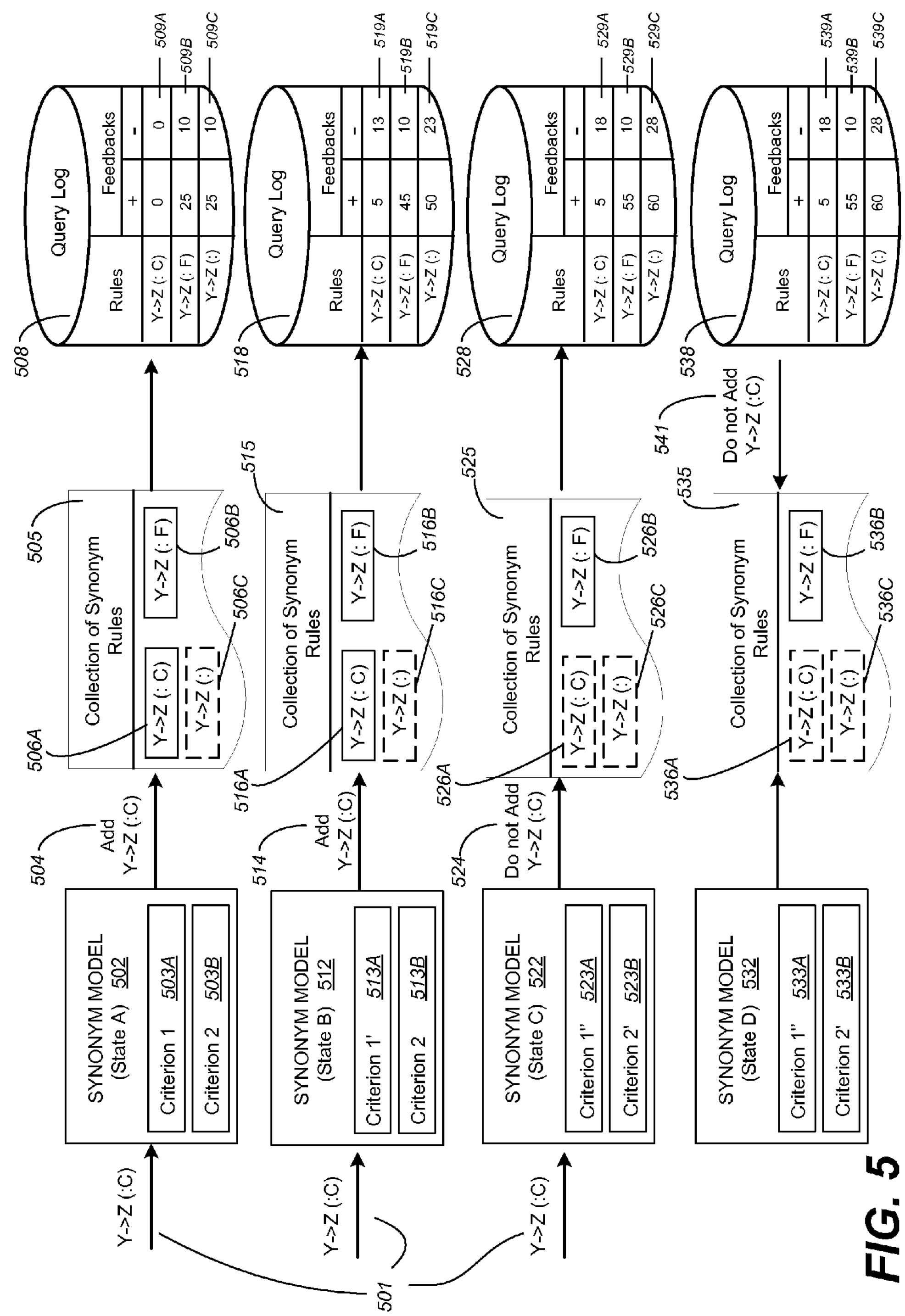
FIG. 5 shows an example of not adding back a context-specific synonym rule based on evaluation of historic usage data.

FIG. 5 shows an example of not adding back a context-specific synonym rule based on the evaluation of historic usage data, where each succeeding state occurs some time later than the previous state. During state (A), the synonym model 502 evaluates the context-specific synonym rule "Y→Z (:C)" 501 using criteria {Criterion 1} 503A and {Criterion 2} 503B. The context-specific synonym rule 501 satisfies the two criteria 503A and 503B, and the synonym model sends an indication 504 to add the context-specific synonym rule 501 to the collection 505 of synonym rules. The context-specific synonym rule 501 is added to a data structure 506A in the collection 505. Before receiving the indication 504, the collection 505 has not added the context-specific synonym rule 501, so there is no user interaction associated with this context-specific synonym rule. The historic usage data 509A for the context-specific synonym rule 501 in the query log 508 is therefore zero or empty.

During state (A), another context-specific synonym rule "Y→Z (:F)" 506B has already been added to a data structure 506B in the collection 505 for a period of time, and historic usage data 509B associated with the context-specific synonym rule "Y→Z (:F)" has accumulated to have a positive feedback count of "25" and a negative feedback count of "10."

During state (A), the general context synonym rule "Y→Z (:)" is not and has not been added to the collection 505, and the absence of the general context synonym rule "Y→Z (:)" in the collection 505 is illustrated as a dashed box 506C. Although the general context synonym rule "Y→Z (:)" is not in the collection 505, the accumulation of the historic usage data associated with the context-specific synonym rule "Y→Z (:F)" has allowed the historic usage data associated with the general context synonym rule "Y→Z (:)" to accumulate as well. Specifically, the general context synonym rule "Y→Z (:)" includes the context-specific synonym rule "Y→Z (:F)." During state (A), the historic usage data 509C associated with the context-specific synonym rule "Y→Z (:)" has a positive feedback count of "25" and a negative feedback count of "10."

During state (B), the synonym model 512 the context-specific synonym rule 501 using upgraded criteria {Criterion 1'} 513A and {Criterion 2} 513B. The context-specific synonym rule 501 satisfies the two criteria 513A and 513B, and the synonym model sends an indication 514 to add the context-specific synonym rule 501 to the collection 515 of synonym rules. The context-specific synonym rule 501 is added to a data structure 516A in the collection 515. During state (B), since the collection 515 has already contained the context-specific synonym rule 501 over a period of time, user interactions associated with this context-specific synonym rule have accumulated in the query log 518. Here, the historic usage data 519A for the context-specific synonym rule 501 includes a positive feedback count of "5" and a negative feedback count of "13."

During state (B), the synonym rule "Y→Z (:F)" is included in a data structure 516B in the collection 515, and the historic usage data 519B for this rule has continued to accumulate to have a positive feedback count of "45" and a negative feedback count of "10."

During state (B), the general context synonym rule "Y→Z (:)" is not and has not been added to the collection 515, and the absence of the general context synonym rule "Y→Z (:)" in the collection 515 is illustrated here as a dashed box 516C. Although the general context synonym rule "Y→Z (:)" is not in the collection 515, the accumulation of the historic usage data associated with the context-specific synonym rules "Y→Z (:C)" and "Y→Z (:F)" has allowed the historic usage data associated with the general context synonym rule "Y→Z (:)" to accumulate as well. Specifically, the general context synonym rule "Y→Z (:)" includes the context-specific synonym rules "Y→Z (:C)" and "Y→Z (:F)." During state (B), the historic usage data 519C associated with the context-specific synonym rule "Y→Z (:)" has a positive feedback count of "50" and a negative feedback count of "23."

During state (C), the synonym model 522 evaluates the context-specific synonym rule 501 using upgraded criteria {Criterion 1"} 523A and {Criterion 2'} 523B. Here, the general context synonym rule 501 does not satisfy one or both of the criteria 523A and 523B, and the synonym model 522 sends an indication 524 to not add the context-specific synonym rule 501 to the collection 525 of synonym rules. The context-specific synonym rule 501 is then removed from the collection 525, as illustrated as the dashed box 526A. During state (C), since the collection 525 has already contained the context-specific synonym rule 501 over a period of time prior to the synonym rule removal, user interactions associated with this context-specific synonym rule have further accumulated in the query log 528. Here, the historic usage data 529A for the context-specific synonym rule 501 includes a positive feedback count of "5" and a negative feedback of "18".

During state (C), the synonym rule "Y→Z (:F)" is included in the data structure 526B in the collection 525, and the historic usage data 529B for this rule has continued to accumulate to have a positive feedback count of "55" and a negative feedback count of "10."

During state (C), the general context synonym rule "Y→Z (:)" is not and has not been added to the collection 525, and the absence of the general context synonym rule "Y→Z (:)" in the collection 525 is illustrated here as a dashed box 526C. Although the general context synonym rule "Y→Z (:)" is not in the collection 525, the accumulation of the historic usage data associated with the context-specific synonym rules "Y→Z (:C)" and "Y→Z (:F)" has allowed the historic usage data associated with the general context synonym rule "Y→Z (:)" to accumulate as well. During state (C), the historic usage data 529C associated with the context-specific synonym rule "Y→Z (:)" has a positive feedback count of "60" and a negative feedback count of "28."

During state (D), an indication is received notifying that the context-specific synonym rule 501 which was in the collection has now been removed, and the historic usage data in the query log 538 is evaluated. In this present example, the historic usage data is available for (i) the context-specific synonym rule "Y→Z (:C)" 539A, (ii) the context-specific synonym rule "Y→Z (:F)" 539B, and (iii) the general context synonym rule "Y→Z (:)" 539C. Here the historic usage data 539B for the context-specific synonym rule "Y→Z (:F)" is not evaluated because this rule is not related to the context-specific synonym rule "Y→Z (:C)" in any context. The historic usage data 539C for the general context synonym rule "Y→Z (:)" is not evaluated here, because the general context synonym rule "Y→Z (:)" is not included in the collection 535, and the historic usage data 539C includes the historic usage data for the context-specific synonym rule "Y→Z (:F)." Here, the historic usage data 539A for the context-specific synonym rule "Y→Z (:C)" is evaluated.

In this present example, the evaluation criterion is satisfied when the counts of positive feedbacks exceed the counts of negative feedbacks for the context-specific synonym rule 501. The criterion is not satisfied since the historic usage data 539A for the context-specific synonym rule 501 has higher negative counts than negative counts. An indication 541 is sent to the collection 535 to not add the context-specific synonym rule 501 to the collection 535. The removal, or not adding back, of the data structure representing the context-specific synonym rule 501 in the collection 535 is illustrated here as a dashed box 536A.

Figure 6:
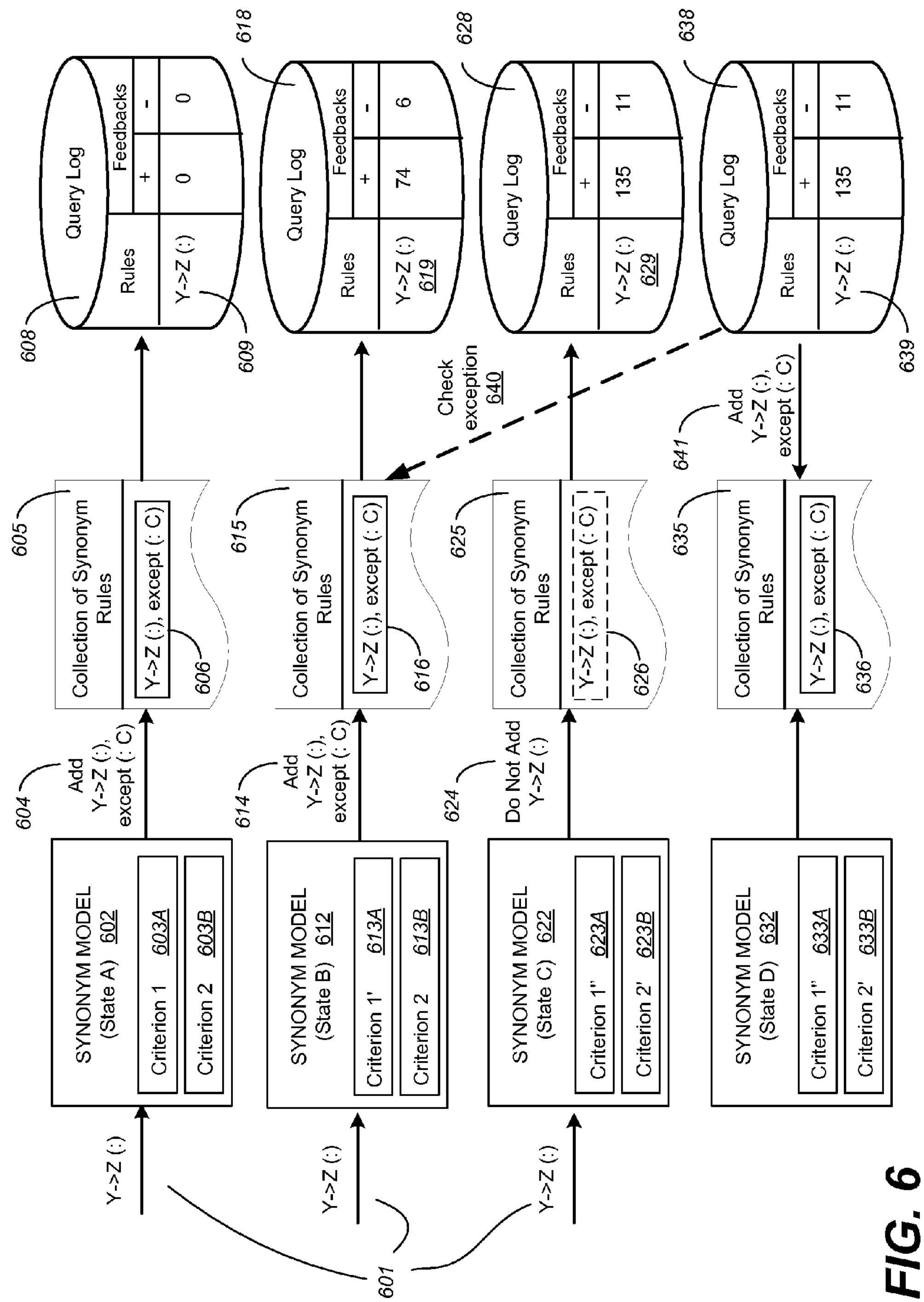
FIG. 6 shows an example of adding back an exception-defined general context synonym rule based on evaluation of historic usage data.

FIG. 6 shows an example of adding back an exception-defined general context synonym rule based on evaluation of historic usage data, where each succeeding state occurs at some time later than the previous state. During state (A), the synonym model 602 evaluates the general context synonym rule "Y→Z (:)" 601 using criteria {Criterion 1} 603A and {Criterion 2} 603B. The general context synonym rule 601 satisfies the two criteria 603A and 603B with an exception in a context "C", so the synonym model sends an indication 604 to add the exception-defined general context synonym rule "Y→Z (:), except (:C)" to the collection 605 of synonym rules.

The exception-defined general context synonym rule "Y→Z (:), except (:C)" is added to a data structure 606 in the collection 605. Before receiving the indication 604, the collection 605 has not added the exception-defined general context synonym rule "Y→Z (:), except (:C)", so there is no user interaction associated with this exception-defined general context synonym rule. Also, the query log 608 has no usage data related to an exception context, because in an exception context, query terms corresponding to a synonym rule are not substituted with synonym terms. Therefore the historic usage data 609 will not include any user interaction history associated with the general context synonym rule in the exception context. The historic usage data 609 for the general context synonym rule 601 in the query log 608 during state (A) is zero or empty.

During state (B), the synonym model 612 evaluates the general context synonym rule 601 using upgraded criteria {Criterion 1'} 613A and {Criterion 2} 613B. The general context synonym rule 601 satisfies the two criteria 613A and 613B with an exception in a context "C", so the synonym model sends an indication 614 to add the exception-defined general context synonym rule "Y→Z (:), except (:C)" to the collection 615 of synonym rules. The exception-defined general context synonym rule "Y→Z (:), except (:C)" is added to a data structure 616 in the collection 615. During state (B), since the collection 615 has already contained the exception-defined general context synonym rule "Y→Z (:), except (C)" over a period of time, user interactions associated with this exception-defined general context synonym rule have accumulated in the query log 618. In some implementations, the historic usage data 619 contains positive and negative feedbacks. Here, the historic usage data 619 for the general context synonym rule 601 includes a positive feedback of "74" and a negative feedback of "6." The historic usage data 619 does not include any user interactions related to the context-specific synonym rule "Y→Z (:C)" because of the defined exception.

During state (C), the synonym model 622 evaluates the general context synonym rule 601 using upgraded criteria {Criterion 1"} 623A and {Criterion 2'} 623B. Here, the general context synonym rule 601 does not satisfy one or both of the criteria 623A and 623B, and the synonym model 622 sends an indication 624 to not add the general context synonym rule 601 to the collection 625 of synonym rules. The exception-defined general context synonym rule "Y→Z (:), except (:C)" is then removed from the collection 625, as illustrated as the dashed box 626. During state (C), since the collection 625 has already included the exception-defined general context synonym rule "Y→Z (:), except (:C)" over a period of time prior to the synonym rule removal, user interactions associated with this exception-defined general context synonym rule have further accumulated in the query log 628. Here, the historic usage data 629 for the general context synonym rule 601 includes a positive feedback of "135" and a negative feedback of "11." The historic usage data 629 does not include any user interactions related to the context-specific synonym rule "Y→Z (:C)" because of the defined exception.

During state (D), an indication that a synonym rule which was in the collection has now been removed is received, and the historic usage data 639 in the query log 638 is evaluated. In this present example, the evaluation criterion is satisfied when the counts of positive feedbacks exceed the counts of negative feedbacks for the general context synonym rule 601. Here, the criterion is satisfied, but the general context synonym rule 601 cannot be added directly to the collection 635 because the historic usage data 639 does not include user interactions related to the context-specific synonym rule "Y→Z (:C)".

Any exception to the general context synonym rule 601 is checked with an indication 640 to an earlier collection, for example, the collection 615. In some implementations, an exception to a general context synonym rule can be stored in a history of synonym rules within a collection of synonym rules. In this present example, an exception in the context of "C" is identified for the general context synonym rule 601. An indication 641 is then sent to the collection 635 to add the exception-defined general context synonym rule "Y→Z (:), except (:C)" back to the collection 635. The exception-defined general context rule "Y→Z (:), except (:C)" is then added to a data structure 636 in the collection 635.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:

receiving an indication that a synonym rule that was previously determined, at a first time, to be included in a collection of synonym rules is determined not to be included in the collection at a second time that is later than the first time, wherein, at the second time, criteria used to determine which synonym rules are to be included in the collection are different from criteria used at the first time to determine which synonym rules are to be included in the collection;

receiving historic usage data relating to the synonym rule;

determining, using the historic usage data relating to the synonym rule, to add the synonym rule to the collection despite receiving the indication that the synonym rule is determined not to be included in the collection; and in response to determining to add the synonym rule, adding the synonym rule to the collection.

2. The method of claim 1, wherein the collection of synonym rules includes synonym rules that a query revision engine uses to revise search queries.

3. The method of claim 1, wherein:

receiving an indication comprises receiving, from a synonym engine, an indication that a model that is used by the synonym engine to determine whether synonym rules are to be added to the collection has determined that the synonym rule is to not be added to the collection, and adding the synonym rule comprises adding the synonym rule despite receiving the indication that the synonym rule is not to be added to the collection.

4. The method of claim 1, wherein receiving an indication comprises receiving an indication that the synonym rule has been removed from, or is to be removed from, the collection.

5. The method of claim 1, wherein the historic usage data relating to the synonym rule comprises data that reflects whether, when a search engine revised a search query using the synonym rule, a user was satisfied with a search result associated with the revised search query.

6. The method of claim 5, wherein the data that reflects whether a user was satisfied with a search result associated with the revised search query comprises data that reflects whether a user selected or did not select a search result associated with the revised search query.

7. The method of claim 1, wherein:

determining to add the synonym rule to the collection comprises determining that, when the synonym rule was previously added to the collection, an exception was defined for the synonym rule; and adding the synonym rule to the collection comprises defining the same exception for the synonym rule when the synonym rule is added to the collection.

8. The method of claim 1, wherein:

the synonym rule is a specific context synonym rule; and receiving historic usage data relating to the synonym rule comprises:

receiving historic usage data relating to the specific context synonym rule, determining that a general context synonym rule that corresponds to the specific context synonym rule is currently added to the collection of synonym rules, then receiving historic usage data relating to the general context synonym rule correspond to the specific context synonym rule.

9. The method of claim 1, wherein:

the synonym rule is a specific context synonym rule; and receiving historic usage data relating to the synonym rule comprises:

determining that a general context synonym rule that corresponds to the specific context synonym rule is not currently added to the collection of synonym rules, then receiving historic usage data relating to the specific context synonym rule without receiving historic usage data relating to the general context synonym rule.

10. A computer-readable storage device having stored thereon instructions, which, when executed by a computer, cause the computer to perform operations comprising:

receiving an indication that a synonym rule that was previously determined, at a first time, to be included in a collection of synonym rules is determined not to be included in the collection at a second time that is later than the first time, wherein, at the second time, criteria used to determine which synonym rules are to be included in the collection are different from criteria used at the first time to determine which synonym rules are to be included in the collection;

receiving historic usage data relating to the synonym rule;

determining, using the historic usage data relating to the synonym rule, to add the synonym rule to the collection despite receiving the indication that the synonym rule is determined not to be included in the collection; and in response to determining to add the synonym rule, adding the synonym rule to the collection.

11. The storage device of claim 10, wherein the collection of synonym rules includes synonym rules that a query revision engine uses to revise search queries.

12. The storage device of claim 10, wherein:

receiving an indication comprises receiving, from a synonym engine, an indication that a model that is used by the synonym engine to determine whether synonym rules are to be added to the collection has determined that the synonym rule is to not be added to the collection, and adding the synonym rule comprises adding the synonym rule despite receiving the indication that the synonym rule is not to be added to the collection.

13. The storage device of claim 10, wherein receiving an indication comprises receiving an indication that the synonym rule has been removed from, or is to be removed from, the collection.

14. The storage device of claim 10, wherein the historic usage data relating to the synonym rule comprises data that reflects whether, when a search engine revised a search query using the synonym rule, a user was satisfied with a search result associated with the revised search query.

15. The storage device of claim 14, wherein the data that reflects whether a user was satisfied with a search result associated with the revised search query comprises data that reflects whether a user selected or did not select a search result associated with the revised search query.

16. The storage device of claim 10, wherein:

determining to add the synonym rule to the collection comprises determining that, when the synonym rule was previously added to the collection, an exception was defined for the synonym rule; and adding the synonym rule to the collection comprises defining the same exception for the synonym rule when the synonym rule is added to the collection.

17. The storage device of claim 10, wherein:

the synonym rule is a specific context synonym rule; and receiving historic usage data relating to the synonym rule comprises:

receiving historic usage data relating to the specific context synonym rule, determining that a general context synonym rule that corresponds to the specific context synonym rule is currently added to the collection of synonym rules, then receiving historic usage data relating to the general context synonym rule correspond to the specific context synonym rule.

18. The storage device of claim 10, wherein:

the synonym rule is a specific context synonym rule; and receiving historic usage data relating to the synonym rule comprises:

determining that a general context synonym rule that corresponds to the specific context synonym rule is not currently added to the collection of synonym rules, then receiving historic usage data relating to the specific context synonym rule without receiving historic usage data relating to the general context synonym rule.

19. A system comprising:

one or more computers; and a computer-readable storage device having stored thereon instructions that, when executed by the one or more computers, cause the one or more computers to perform operations comprising:

receiving an indication that a synonym rule that was previously determined, at a first time, to be included in a collection of synonym rules is determined not to be included in the collection at a second time that is later than the first time, wherein, at the second time, criteria used to determine which synonym rules are to be included in the collection are different from criteria used at the first time to determine which synonym rules are to be included in the collection;

receiving historic usage data relating to the synonym rule;

determining, using the historic usage data relating to the synonym rule, to add the synonym rule to the collection despite receiving the indication that the synonym rule is determined not to be included in the collection; and in response to determining to add the synonym rule, adding the synonym rule to the collection.

20. The system of claim 19, wherein the collection of synonym rules includes synonym rules that a query revision engine uses to revise search queries.

21. The system of claim 19, wherein:

receiving an indication comprises receiving, from a synonym engine, an indication that a model that is used by the synonym engine to determine whether synonym rules are to be added to the collection has determined that the synonym rule is to not be added to the collection, and adding the synonym rule comprises adding the synonym rule despite receiving the indication that the synonym rule is not to be added to the collection.

22. The system of claim 19, wherein receiving an indication comprises receiving an indication that the synonym rule has been removed from, or is to be removed from, the collection.

23. The system of claim 19, wherein the historic usage data relating to the synonym rule comprises data that reflects whether, when a search engine revised a search query using the synonym rule, a user was satisfied with a search result associated with the revised search query.

24. The system of claim 23, wherein the data that reflects whether a user was satisfied with a search result associated with the revised search query comprises data that reflects whether a user selected or did not select a search result associated with the revised search query.

25. The system of claim 19, wherein:

determining to add the synonym rule to the collection comprises determining that, when the synonym rule was previously added to the collection, an exception was defined for the synonym rule; and adding the synonym rule to the collection comprises defining the same exception for the synonym rule when the synonym rule is added to the collection.

26. The system of claim 19, wherein:

the synonym rule is a specific context synonym rule; and receiving historic usage data relating to the synonym rule comprises:

receiving historic usage data relating to the specific context synonym rule, determining that a general context synonym rule that corresponds to the specific context synonym rule is currently added to the collection of synonym rules, then receiving historic usage data relating to the general context synonym rule correspond to the specific context synonym rule.

27. The system of claim 19, wherein:

the synonym rule is a specific context synonym rule; and receiving historic usage data relating to the synonym rule comprises:

determining that a general context synonym rule that corresponds to the specific context synonym rule is not currently added to the collection of synonym rules, then receiving historic usage data relating to the specific context synonym rule without receiving historic usage data relating to the general context synonym rule.

28. A computer-implemented method comprising:

receiving an indication that, at a first time, a model that is used by a synonym engine to determine whether synonym rules are to be added to a collection has determined that a particular synonym rule is to be included in the collection;

receiving an indication that, at a second time that is later than the first time, the model has determined that the particular synonym rule is not to be included in the collection, wherein, at the second time, the model includes criteria for determining which synonym rules are to be included in the collection that are different from criteria used at the first time for determining which synonym rules are to be included in the collection;

based on receiving the indication that, at the second time, the particular synonym rule is no longer to be included in the collection, receiving historic usage data relating to the particular synonym rule;

determining, using the historic usage data relating to the particular synonym rule, to add the particular synonym rule to the collection despite receiving the indication that the synonym rule is determined not to be included in the collection; and in response to determining to add the particular synonym rule to the collection, adding the particular synonym rule to the collection.

* * * * *